United States Patent [19]
Ueno et al.

[11] 4,338,410
[45] Jul. 6, 1982

[54] PROCESS FOR PRODUCING GRAFT COPOLYMERS

[75] Inventors: Katsuji Ueno, Hirakata; Takashi Maruyama, Toyonaka, both of Japan

[73] Assignee: Sumitomo Chemical Company, Limited, Osaka, Japan

[21] Appl. No.: 120,398

[22] Filed: Feb. 11, 1980

[30] Foreign Application Priority Data

Feb. 23, 1979 [JP] Japan .................................. 54/20954

[51] Int. Cl.³ .............................................. C08F 8/00
[52] U.S. Cl. .................................. 525/132; 525/151; 525/152; 525/392; 525/905
[58] Field of Search ............... 525/132, 905, 151, 152, 525/392

[56] References Cited

U.S. PATENT DOCUMENTS 3,956,242 5/1976 Olander ............................... 528/212
4,207,406 6/1980 Olander ............................... 525/132

FOREIGN PATENT DOCUMENTS 52-142799 11/1977 Japan .................................. 525/132

*Primary Examiner*—J. Ziegler
*Attorney, Agent, or Firm*—Stevens, Davis, Miller & Mosher

[57] ABSTRACT

A process for producing a graft copolymer characterized by melt-blending 100 parts by weight of a resin mixture comprising 90 to 10% by weight of a polyphenylene oxide having a structural unit of

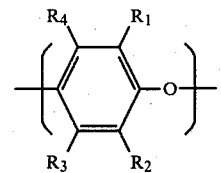

(wherein $R_1$, $R_2$, $R_3$ and $R_4$ each represents hydrogen, a halogen atom, a hydrocarbon or substituted hydrocarbon radical) and 10 to 90% by weight of a styrene polymer in the presence of 0.01 to 5 parts by weight of a compound containing nitrogen and oxygen selected from oxime compounds and nitroso compounds.

10 Claims, No Drawings

PROCESS FOR PRODUCING GRAFT COPOLYMERS

This invention relates to a process for producing a graft copolymer comprising a polyphenylene oxide and a styrene polymer as constitutional ingredients and containing no ungrafted polyphenylene oxide.

Although polyphenylene oxides are known to be resins excellent in heat resistance, mechanical and electrical properties, etc., they have a disadvantage of inferior processability owing to, for example, a high softening point and a low fluidity inherent in polyphenylene oxides.

A number of techniques have been proposed for improving the processability of polyphenylene oxides. For instance, there have been disclosed a method in which a polyphenylene oxide is blended with a styrene polymer and another method in which styrene is grafted onto a polyphenylene oxide in Japanese Patent Publication Nos. 17,812/1968 and 47,862/1972, respectively.

In modifying a resin, graft copolymerization is generally advantageous over blending in view of compatibility of component resins. The graft copolymerization, on the other hand, has a commercial disadvantage of requiring a polymerizer and other equipment for grafting. To solve simultaneously the above-noted problems, there has been proposed in Japanese Patent Application Kokai "Laid-open" No. 142,799/1977 a method in which a polyphenylene oxide and a styrene polymer are blended in molten state in the presence of a peroxide.

In the case of the above method, however, a high degree of grafting is not attained unless a comparatively large amount of a peroxide is used. The use of a large amount of a peroxide is accompanied by an increase in the production cost, a danger of explosion during the operation, and retention in the resin of residual decomposition products of the peroxide, which result in a decrease in softening point of the resin as well as cause silver streak and foaming in the molded articles. For this reason, a further step of improvement is required for the method to be of practical use.

Under the circumstances, the present inventors made an effort to find a commercially feasible simple process for producing a practically useful molding material excellent in moldability and capable of yielding molded articles having excellent appearance and, when injection-molded, producing an article which exhibits minimum anisotropy. As a result, it has been found that the intended object can be achieved by blending a molten mixture of a polyphenylene oxide and a styrenene polymer in the presence of small amounts of compounds herein specified.

An object of this invention is to provide a process for producing a graft copolymer comprising a polyphenylene oxide grafted with a styrene polymer.

Another object of this invention is to provide a process for producing a graft copolymer having excellent thermal properties and exhibiting little anisotropy on being molded.

Other objects and advantages of this invention will become apparent from the following description.

This invention provides a commercially advantageous process for producing a graft copolymer containing substantially no ungrafted polyphenylene oxide, which comprises melt blending 100 parts by weight of a resin mixture comprising 90 to 10% by weight of a polyphenylene oxide or a copolymer comprising polyphenylene oxide as major component and 10 to 90% by weight of a styrene polymer in the presence of 0.01 to 5 parts by weight of a compound containing nitrogen and oxygen selected from oxime compounds and nitroso compounds. According to this invention, there is produced advantageously on a commercial scale a graft copolymer containing substantially no ungrafted polyphenylene oxide by the simple blending of a resin mixture admixed with a small amount of a specified compound.

The polyphenylene oxide being used in the present process is a polymer having constitutional repeating units of the general formula

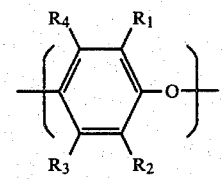

wherein $R_1$, $R_2$, $R_3$ and $R_4$ each represents hydrogen, a halogen atom, a hydrocarbon or substituted hydrocarbon radical.

Examples of the substituents $R_1$, $R_2$, $R_3$ and $R_4$ are atoms and groups such as hydrogen, chlorine, bromine, iodine, methyl, ethyl, propyl, allyl, phenyl, tolyl, benzyl, chlorophenyl, bromophenyl, methylbenzyl, chloromethyl and bromomethyl.

Examples of particular polyphenylene oxides having the unit structure of the above formula include poly(2,6-dimethyl-1,4-phenylene oxide), poly(2-methyl-1,4-phenylene oxide), poly(3-methyl-1,4-phenylene oxide), poly(2,6-diethyl-1,4-phenylene oxide), poly(2,6-dipropyl-1,4-phenylene oxide), poly(2-methyl-6-allyl-1,4-phenylene oxide), poly(2,6-dichloromethyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide), and poly(2,5-dimethyl-1,4-phenylene oxide).

Copolymers having the unit structure of the above formula can also be used. Examples of such copolymers include copolymers of 2,6-disubstituted phenols with 2,4-disubstituted phenols, copolymers of 2,6-disubstituted phenols with 2,3,6-trisubstituted phenols, and copolymers of 2,6-disubstituted phenols with 2-substituted phenols, 3-substituted phenols or 4-substituted phenols.

It is also possible to use various modified polyphenylene oxides formed by grafting vinyl monomers such as, for example, styrene, ethylene, and methyl methacrylate onto polyphenylene oxides having the unit structure of the aforementioned general formula.

The polyphenylene oxide used in this invention has a number-average polymerization degree selected preferably from the range of from 60 to 250.

The styrene polymers, as herein referred to, include polymers of styrenes and copolymers of styrenes with other monomers. The polymors of styrenes include homopolymers of alkenyl aromatic compounds or copolymers of two or more alkenyl aromatic compounds. Examples of individual alkenyl aromatic compounds are styrene, chlorostyrene, dichlorostyrene, p-methoxystyrene, p-nitrostyrene, p-methylstyrene, p-phenylstyrene, p-acetoxystyrene, p-hydroxystyrene, m-hydroxystyrene, p-divinylbenzene, aminostyrene, chloromethylstyrene and α-methylstyrene. The copolymers of styrenes with other monomers include copolymers of one or more alkenyl aromatic compounds with vinyl monomers other than alkenyl aromatic compounds and/or diene monomers.

The styrene content of the copolymer is preferably at least 10% by weight.

Examples of vinyl monomers and diene monomers other than alkenyl aromatic compounds include those copolymerizable with styrenes, such as ethylene, propylene, vinyl chloride, methyl methacrylate, methyl acrylate, acrylonitrile, butadiene, isoprene, maleic anhydride, isobutylene, and vinyl acetate. These monomers can be used in combinations of two or more of them.

Oxime compounds used in the present process are known compounds. Particularly preferred are quinone oxime compounds represented by the general formula

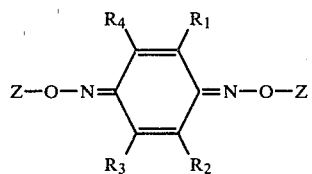

or

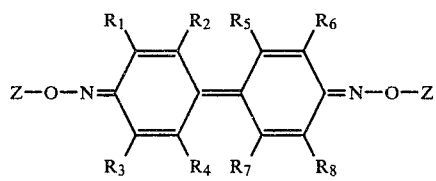

wherein $R_1$, $R_2$, $R_3$, $R_4$, $R_5$, $R_6$, $R_7$ and $R_8$, which may be the same or different, are each selected from hydrogen, halogen atoms, hydrocarbon radicals, substituted hydrocarbon radicals, cyano group, nitro group, alkoxy group, phenoxy group, amino group and hydroxyl group; and Z is selected from hydrogen, benzoyl group, acetyl group, propionyl group and butyroyl group.

Examples of such quinone oximes are p-quinone dioxime, tetrachloroquinone dioxime, dichlorodicyanoquinone dioxime, 2-methylquinone dioxime, tetramethylquinone dioxime, 2-phenylquinone dioxime, tetramethyldiphenoquinone dioxime, 2,6,2',6'-tetramethyl-3-chlorodiphenoquinone dioxime; and benzoylated, acetylated, propionylated and butyroylated derivatives of said quinone oximes.

Nitroso compounds for use in the present process are also known compounds. Particularly preferred are those represented by the following general formula:

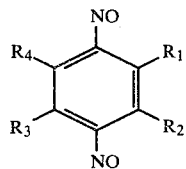

or

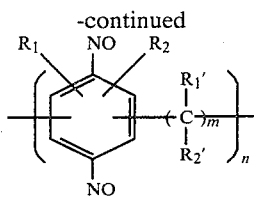

wherein $R_1$, $R_2$, $R_3$ and $R_4$ are the same as defined above in connection with the general formula of quinone oximes, $R_1'$ and $R_2'$ represent each hydrogen, an alkyl or phenyl group, m is an integer of from 0 to 10, and n is an integer of from 2 to 100.

Examples of individual dinitrosobenzenes are dinitrosobenzene, methyldinitrosobenzene, dimethyldinitrosobenzene, trimethyldinitrosobenzene, tetramethyldinitrosobenzene, chlorodinitrosobenzene, dichlorodinitrosobenzene, tetrachlorodinitrosobenzene, and poly-p-dinitrosobenzene. These are used each alone or in combinations.

The mixing ratio of the polyphenylene oxide and the styrene polymer used in this invention is 90 to 10, preferably 75 to 25% by weight of the former to 10 to 90, preferably 25 to 75% by weight of the latter. If the polyphenylene oxide exceeds 90% by weight, the resulting graft copolymer is hardly improved in processability, and, in addition, a fairly large amount of the polyphenylene oxide remain ungrafted, while if the polyphenylene oxide is below 10% by weight, the graft copolymer will lose in heat resistance characteristic of the polyphenylene oxide.

According to this invention, the oxime compound and/or the nitroso compound is used in an amount of 0.01 to 5, preferably 0.05 to 3, most preferably 0.1 to 1 part by weight for 100 parts by weight of the mixture of polyphenylene oxide and styrene polymer. If the amount is below 0.01 part by weight, a fairly large amount of polyphenylene oxide remains ungrafted, while if the amount exceeds 5 parts by weight, an undesirable gel-like polymer tends to form.

According to this invention, a polyphenylene oxide, a styrene polymer, an oxime compound and/or a nitroso compound are intermixed by melt-blending. Although the melt-blending temperature can be any temperature at which the mixture of polyphenylene oxide and styrene polymer may melt. Too high a temperature tends to cause deterioration of the resin. In view of this, a desirable temperature range is from 130° to 300° C., preferably from 180° to 300° C. The blending equipment can be any equipment capable of treating a high viscosity melt. Both batch and continuous systems can be used. Examples of such equipment include extruder, kneader, Banbury mixer, mixing roll and internal mixer. The melt-blending time is not critical but is usually 20 seconds to 30 minutes, preferably 1 to 20 minutes.

Unless the grafting reaction is hindered, it is possible to add to the reaction system known other substances such as vulcanization-accelerators and -activators, stabilizers, other polymers, glass fiber, carbon fiber, plasticizers, pigments, carbon black, titanium white, silica and other inorganic fillers, flame retardants, etc. Examples of individual substances are as described in "Handbook of Compounding Chemicals for Rubbers and Plastics" (Rubber Digest Co., Ed.; published June 15, 1966).

The addition of vulcanization-activator or -accelerator is desired to accelerate the grafting reaction. In other words, the use of these compounds makes blending time shorter, blending temperature lower and the amount of oxime compound or nitroso compound used smaller. The vulcanization-activators or -accelerators are those being used conventionally for the vulcanization of rubbers.

As the valcanization-activators, there may be used stearic acid, zinc oxide, magnesium oxide, lead oxide and the like, and as the vulcanization accelerators, there may be used N-cyclohexylbenzothiazyl sulfenamide, N-oxydiethylenebenzothiazyl sulfenamide, N-tertiary-butyl-2-benzothiazyl sulfenamide, zinc salt of mercaptobenzothiazole, 2-mercaptoimidazoline, sodium dimethyldithiocarbamate, sodium diethyldithiocarbamate, hexamethylenetetramine, tetramethylthiuram disulfide, tetramethylthiuram monosulfide, dipentamethylenethiuram hexasulfide, potassium dimethyl dithiocarbamate, sodium dibutyl dithiocarbamate, zinc dimethyl dithiocarbamate, zinc diethyl dithiocarbamate, zinc ethylphenyl dithiocarbamate, copper dimethyl dithiocarbamate, selenium diethyl dithiocarbamate, tellurium diethyl dithiocarbamate, diphenylguanidine, di-tolylguanidine, thiocarbanilide, ditolylthiourea, mercaptobenzothiazole, dibenzothiazyl disulfide and the like.

The amount of the vulcanization-activator or -accelerator used is 0.01 to 10 parts, preferably 0.05 to 5 parts by weight, more preferably 0.1 to 3 parts by weight per 100 parts by weight of the resin mixture of the polyphenylene oxide and styrene polymer.

The addition of rubber-like polymers is desirable to improve the impact strength of the graft copolymer. Examples of such polymers include butadiene rubber, styrene-butadiene copolymer rubber, styrene-butadiene block copolymer rubber, isoprene rubber, isobutylene rubber, propylene rubber, ethylene-propylene copolymer rubber, acrylic rubber, polyester rubber, polyamide rubber, urethane rubber, and the like.

These rubber-like polymers are added in amounts similar to those generally used in resin compositions reinforced with the rubber-like polymers, the preferred amounts being in the range of 1 to 30 parts by weight for 100 parts by weight of the total of polyphenylene oxide and styrene polymer.

That the graft copolymer produced by the process of this invention contains no ungrafted polyphenylene oxide can be confirmed by the solvent fractionation or by the method reported by A. Factor et al. in J. Polymer Sci., 7b, 205 (1969). According to the report, polyphenylene oxide can be identified by utilizing the phenomenon that polyphenylene oxide becomes insoluble in methylene chloride owing to the formation of a composite adduct between polyphenylene oxide and methylene chloride and the adduct releases methylene chloride on being heated, leaving behind polyphenylene oxide. The graft copolymer obtained by the process of this invention was soluble in methylene chloride, forming a uniform solution which will not deposite insolubles; or even if any deposit was formed on long standing, the deposited polymer, after having been thoroughly washed and dried, was found to contain a styrene polymer which was not separable. This confirms that the graft copolymer contained no ungrafted polyphenylene oxide.

The graft copolymers obtained by the process of this invention comprising a polyphenylene oxide and a styrene polymer and containing no ungrafted polyphenylene oxide are applicable in many uses either as such or after blending with other polymers. Examples include blends with styrene polymers such as polystyrene, styrene-acrylonitrile copolymer and styrene-methyl methacrylate copolymer and blends with rubber-modified styrene resins such as, for example, butadiene-base rubber-modified polystyrene and styrene-acrylonitrile copolymer, acrylic rubber-modified polystyrene and styrene-acrylonitrile copolymer, ethylene-propylene copolymer-modified polystyrene, ethylene-methyl methacrylate copolymer-modified polystyrene, and butadiene-base rubber-modified styrene-methyl methacrylate copolymer. Such blends can be further incorporated with inorganic fillers such as glass fiber, carbon fiber, carbon black, titanium white, silica and calcium carbonate, various polymers, plasticizers, flame retardants, pigments, etc.

The invention is illustrated below in detail with reference to Examples, but the invention is not limited thereto.

EXAMPLES 1 TO 3

Mixtures were prepared each from 16 g of poly(2,6-dimethyl-1,4-phenylene oxide) having an intrinsic viscosity $[\eta]$ of 0.55 dl/g (at 25° C. in chloroform), 24 g of a polystyrene ("Esbrite," a trademark for Nippon Polystyrene Co.) and 0.12 g of an oxime or nitroso compound shown in Table 1. Each mixture was melt-blended at 250° C. for 10 minutes in a Brabender plastograph at 50 rpm. A 2.0 g portion of the reaction mixture was dissolved in 40 ml of methylene chloride and left standing for 3 hours. The precipitate, if any, was collected by filtration, washed with methylene chloride, then with methanol, and dried under reduced pressure at 120° C. for 4 hours. The polystyrene content of the precipitate was determined by infrared absorption spectroscopy. The results obtained were as shown in Table 1.

COMPARATIVE EXAMPLE 1

In this Comparative Example, for the purpose of comparison, the procedure in Example 1, 2 or 3 was repeated, except that neither oxime compound nor nitroso compound was used. The results obtained were as shown in Table 1.

COMPARATIVE EXAMPLE 2

In this Comparative Example, for the purpose of comparing the effectiveness of this invention with that of prior art, the procedure of Example 1, 2 or 3 was repeated, except that 0.12 g of cumene hydroperoxide was used in place of the oxime compound or nitroso compound. The results obtained were as shown in Table 1.

TABLE 1

| | Additive | Percent precipitated | Polystyrene content of precipitate (%) |
|---|---|---|---|
| Example 1 | p-Quinone dioxime | 0 | — |
| Example 2 | p,p'-Dibenzoylquinone dioxime | 0 | — |
| Example 3 | Polyac* | 0 | — |
| Comparative Example 1 | — | 38.4 | ≈0 |
| Comparative Example 2 | Cumene hydroperoxide | 38.1 | ≈0 |

Note:
*Trademark for Du Pont Co., a mixture of 25% of polydinitrosobenzene, 6% of oil, 35% of clay, and 34% of magnesium carbonate.

As is apparent from Table 1, in Examples 1, 2 and 3, wherein grafting was carried out according to this invention, no precipitation from methylene chloride was observed, indicating that polyphenylene oxide had been completely transformed into a graft copolymer, leaving none of the unreacted polymer. To the contrary, Comparative Example 1, wherein the resin mixture was simply melt-blended without any additive, and in Comparative Example 2, wherein a peroxide was added as the sole additive, almost all of the reaction system was precipitated, indicating that substantially no grafting took place.

EXAMPLE 4 AND COMPARATIVE EXAMPLE 3

A mixture was prepared by dry-blending 400 g of the same poly(2,6-dimethyl-1,4-phenylene oxide) as used in Example 1, 600 g of an acrylonitrile-styrene copolymer ("Cevian" NJD, a trademark for Daicel Ltd.), and 2 g of p-quinone dioxime. The mixture was melt-blended at 250° C. in a 30-mm φ extruder to carry out the grafting reaction. The retention time was about 5 minutes. In Comparative Example, the above procedure was repeated, except that no p-quinone dioxime was used.

Both of the above melt-blended products were compression molded by means of a hot press at 230° C. under a load of 100 kg to prepare pressed sheets, 3 mm in thickness. The sheet obtained in Comparative Example 3 showed a tinge of opacity, whereas the sheet obtained in Example 4 was completely transparent, indicating that the grafting had taken place.

To each 500 g of the melt-blended products obtained in Example 4 and Comparative Example 3, was added 130 g of a polybutadiene-modified polystyrene (40% in polybutadiene content). Each material thus obtained was blended in an extruder to obtain a pelletized resin which was injection molded to determine the heat distortion temperature and anisotropy of the molded piece.

For the purpose of expressing the degree of anisotropy, two test specimens were cut out of each injection molded piece, the one being cut along the direction of injection and the other along the cross direction and the test specimens were tested for Izod impact strength.

The results shown in Table 2 were those obtained from the graft copolymer prepared in Example 4 according to this invention and in Comparative Example 3, wherein no p-quinone dioxime had been added.

TABLE 2

| | Example 4 | Comparative Example 3 |
|---|---|---|
| Heat distortion temperature (°C.) load: 18.6 kg/cm$^2$ | 108 | 101 |
| Impact strength (kg · cm/cm) | | |
| Parallel direction | 25 | 24 |
| Cross direction | 23 | 14 |

From Table 2, it is seen that the graft copolymer obtained according to this invention is excellent in thermal properties and is a molding material exhibiting less anisotropy on being molded.

EXAMPLES 5 TO 7

Mixtures were prepared each from 20 g of poly(2,6-dimethyl-1,4-phenylene oxide) having an intrinsic viscosity [η] of 0.55 dl/g (at 25° C. in chloroform), 20 g of a polystyrene ("Esbrite" a trademark for Nippon Polystyrene Co.), and an oxime compound and vulcanization-accelerator or -activator shown in Table 3. Each mixture was melt-blended at 250° C. for 7 minutes in a Brabender plastograph at 50 r.p.m. The results obtained were as shown in Table 3.

TABLE 3

| | Additive | | Percent precipitated |
|---|---|---|---|
| | Oxime compound | Vulcanization accelerator | |
| Example 5 | p-Quinone dioxime (0.1 PHR*) | Magnesium oxide (0.1 PHR) | 0 |
| Example 6 | p-Quinone dioxime (0.1 PHR) | Stearic acid (0.1 PHR) | 0 |
| Example 7 | p-Quinone dioxime (0.1 PHR) | Tetramethyl-thiuram disulfide (0.1 PHR), zinc oxide (0.1 PHR) | 0 |

What is claimed is:

1. A process for producing a graft copolymer, which comprises melt-blending 100 parts by weight of a resin mixture comprising 90 to 10% by weight of a polyphenylen oxide having a unit structure of

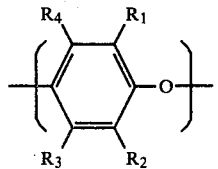

(wherein $R_1$, $R_2$, $R_3$ and $R_4$ each represents hydrogen, a halogen atom, a hydrocarbon or substituted hydrocarbon radical) and 10 to 90% by weight of a styrene polymer in the presence of 0.01 to 5 parts by weight of an oxime compound, a nitroso compond or mixtures thereof.

2. A process according to claim 1, wherein the resin mixture comprising 25 to 75% by weight of a polypenylene oxide and 75 to 25% by weight of a styrene polymer is melt-blended.

3. A process according to claim 1, wherein the polyphenylene oxide is a member selected from the group consisting of poly(2,6-dimethyl-1,4-phenylene oxide), poly(2-methyl-1,4-phenylene oxide), poly(3-methyl-1,4-phenylene oxide), poly(2,6-diethyl-1,4-phenylene oxide), poly(2,6-dipropyl-1,4-phenylene oxide), poly(2-methyl-6-allyl-1,4-phenylene oxide), poly(2,6-dichloromethyl-1,4-phenylene oxide), poly(2,3,6-trimethyl-1,4-phenylene oxide), poly(2,3,5,6-tetramethyl-1,4-phenylene oxide), poly(2,6-dichloro-1,4-phenylene oxide), poly(2,6-diphenyl-1,4-phenylene oxide) and poly(2,5-dimethyl-1,4-phenylene oxide).

4. A process according to claim 3, wherein the polyphenylene oxide is poly(2,6-dimethyl-1,4-phenylene oxide).

5. A process according to claim 1, wherein the styrene polymer is a polymer of an alkenyl aromatic compound selected from the group consisting of styrene, chlorostyrene, dichlorostyrene, p-methoxystyrene, p-nitrostyrene, p-methylstyrene, p-phenylstyrene, p-acetoxystyren, p-hydroxystyrene, m-hydroxystyrene, p-divinylbenzene, aminostyrene, chloromethylstyrene, α-methylstyrene, and methoxystylene.

6. A process according to claim 1, wherein the styrene polymer is a copolymer of an alkenyl aromatic compound with ethylene, propylene, vinyl chloride, methyl methacrylate, methyl acrylate, acrylonitrile, butadiene, isoprene, maleic anhydride, isobutylene or vinyl aacetate.

7. A process according to claim 1, wherein the oxime compound is a member selected from the group consisting of compounds represented by the general formula

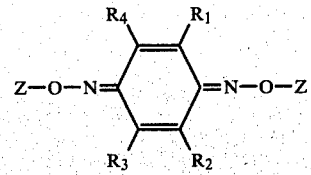

and

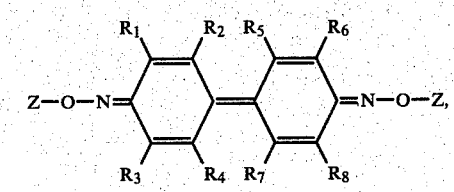

wherein $R_1$, $R_2$, $R_3$, $R_4$, $R_5$, $R_6$, $R_7$ and $R_8$, which may be the same or different, are each member selected from the group consisting of hydrogen, halogen atoms, hydrocarbon radicals, substituted hydrocarbon radicals, cyano group, nitro group, alkoxy groups, phenoxy group, amino group and hydroxyl group; and Z is selected from the group consisting of hydrogen, benzoyl group, acetyl group, propionyl group and butyroyl group.

8. A process according to claim 1, wherein the nitroso compound is a member selected from the group consisting of compounds represented by the general formula

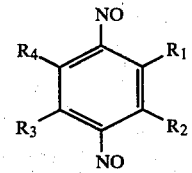

and

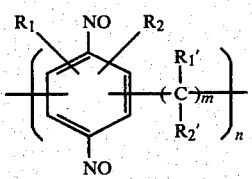

wherein $R_1$, $R_2$, $R_3$ and $R_4$ are as defined in connection with the general formula of quinone oximes; $R_1'$ and $R_2'$ are each hydrogen, an alkyl group or phenyl group; m is an integer of from 0 to 10 and n is an integer of from 2 to 100.

9. A process according to claim 1, wherein a vulcanization-activator or -accelerator is added to the resin mixture in an amount of 0.01 to 10 parts by weight per 100 parts by weight of the resin mixture.

10. A process according to any one of claims 1 to 8 or 9, wherein the temperature of melt-blending is 130° to 300° C.

* * * * *